United States Patent
Polk

[15] 3,663,732
[45] May 16, 1972

[54] CIRCULAR FUNCTION TEACHING AID
[72] Inventor: James A. Polk, R.D. #4, West Chester, Pa. 19380
[22] Filed: Apr. 16, 1970
[21] Appl. No.: 29,178

[52] U.S. Cl. ..................................................... 35/34
[51] Int. Cl. ................................................ G09b 23/04
[58] Field of Search .................... 35/30, 31 A, 34; 33/176

[56] References Cited

UNITED STATES PATENTS 3,359,653  12/1967  Redfern ..................................... 35/34

FOREIGN PATENTS OR APPLICATIONS 118,329  6/1958  U.S.S.R. ..................................... 35/34

Primary Examiner—Wm. H. Grieb
Attorney—Connolly and Hutz

[57] ABSTRACT

A circular function teaching aid includes a pair of concentrically arranged circles which are relatively movable with respect to each other. One of the circles has visible X and Y axes thereon, while the other circle includes a visible rectangle disposed symmetrically with respect to its center and with the corners of the rectangle being coarcuate. A visible diagonal line connects diametrically opposite corners of the rectangle. A flexible distance selector is attached tangentially to one of the circles.

10 Claims, 8 Drawing Figures

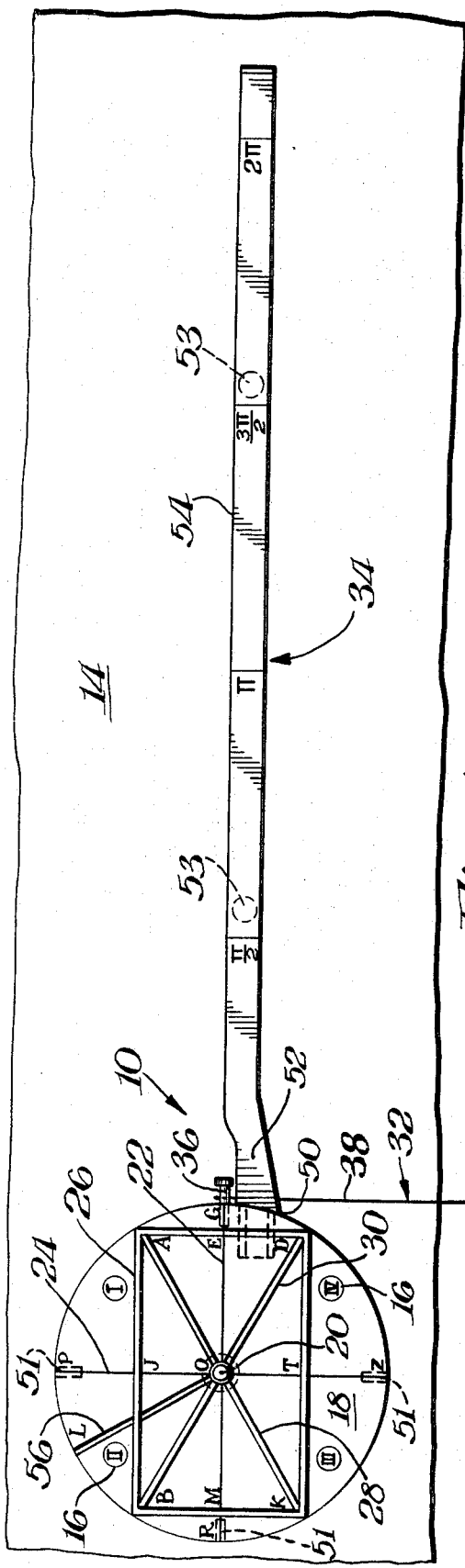
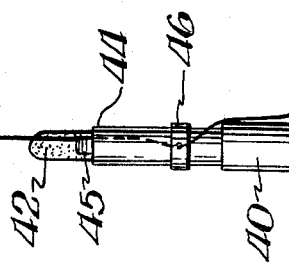
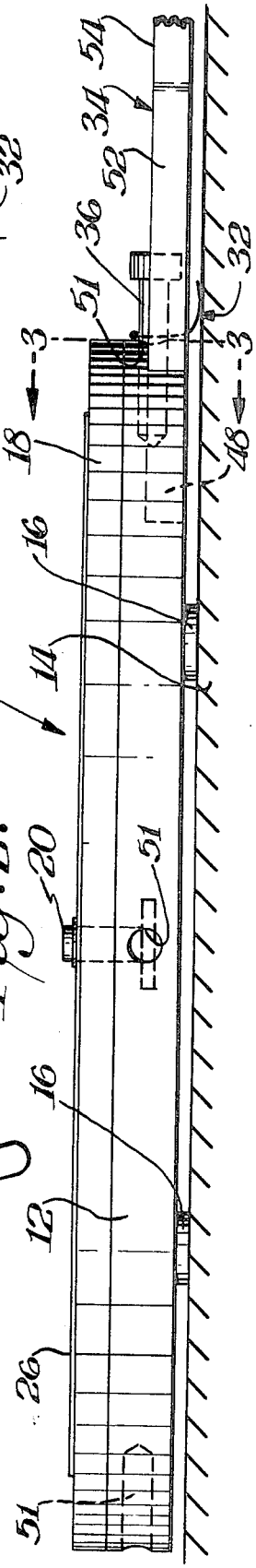

CIRCULAR FUNCTION TEACHING AID

BACKGROUND OF THE INVENTION

Various teaching aids exist for visually demonstrating the concepts involved in various geometrical or trigonometrical studies. One of the most important concepts involved in the teaching of trigonometry is the understanding of the circular function. Heretofore prior devices which are intended to act as teaching aids have been either too complicated or do not have efficient versatility to be adapted for ready use by the teaching profession.

SUMMARY OF INVENTION

An object of this invention is to provide a teaching aid which is particularly adapted for visually demonstrating the circular function.

A further object of this invention is to provide such a teaching aid which by proper manipulation can be used for visually demonstrating a wide variety of trigonometrical concepts.

In accordance with this invention a circular function teaching aid includes a pair of concentrically arranged circles which are relatively movable with respect to each other. One of the circles has visible X and Y axes thereon while the other circle includes a visible rectangle disposed symmetrically with respect to its center and with the corners of the rectangle being coarcuate. A visible diagonal line connects diametrically opposite corners of the rectangle. A flexible distance selector is attached tangentially to one of the circles.

The circle having the X and Y axes thereon may be the fixed circle while the other circle is movable. A number line may be disposed adjacent the circles colinear with the X axis and coplanar with the distance selector. Indicia may be provided on the number line at fixed intervals as a function of pi.

The distance selector may be detachably secured to the fixed circle by being attached to a plug which may be selectively inserted into holes along the circumference of the fixed circle and the X and Y axes. The fixed circle may be mounted on a support surface by the use of securing means disposed in each quadrant and the securing means may have the additional function of visually indicating its respective quadrant.

THE DRAWINGS

FIG. 1 is a front elevation view of a circular function teaching aid in accordance with this invention;

FIG. 2 is an enlarged bottom plan view partly in section of the teaching aid shown in FIG. 1;

FIG. 3 is a cross-sectional view taken through FIG. 2 along the line 3—3; and

DETAILED DESCRIPTION

Figure 4:
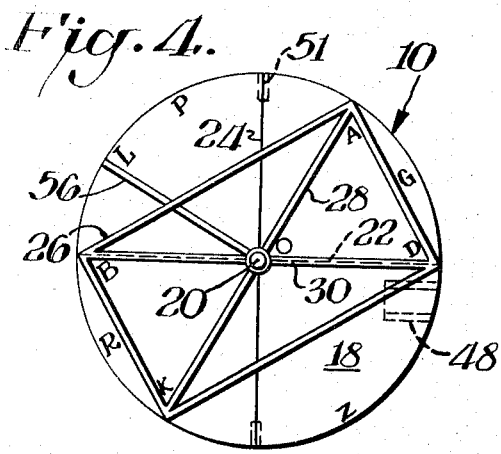
FIGS. 4, 5, 6a, 6b and 7 are front elevation views of the teaching aid shown in FIGS. 1–3 illustrating different phases of manipulation for demonstrating various trigonometrical concepts.

FIGS. 1–2 show the teaching aid 10 in accordance with this invention. As indicated therein a first disk or plate 12 which is made in the form of a circle is secured to a support surface 14 such as a blackboard by spaced securing means 16. A second circular disk or plate 18 is concentrically mounted on circle 12 and is movable with respect to circle 12 by means of pivot post 20 arranged at the center of the circles. Circle 18 is made of any suitable transparent material which has sufficient stiffness to stand up over a long period of time despite the manipulations imparted to it during use. Additionally, this outer circle 18 is preferably made of a material which can receive removable markings thereon such as made by chalk or crayons. A suitable material for circles 12 and 18 is for example the commercially available Lucite or plexiglass. An X axis 22 and a Y axis 24 are printed on fixed circle 12 and are clearly visible because of the transparent nature of outer circle 18.

As clearly shown in FIG. 1 a series of preselected indicia are arranged on movable circle 18. These include a rectangle 26 which is symmetrically arranged about center point 20 and which has its corners coarcuate at the circumference of the circles. Visible diagonal lines 28, 30 connect diametrically opposite corners of rectangle 26. The term "rectangle" is used in its broadest sense and may for example include a square. It is preferable, however, that the rectangle be arranged so that in the position shown in FIG. 1 the corner of the rectangle in the first quadrant is located at an arc distance of $\pi/6$ from G. The selection of this particular rectangle is quite desirable since it maximizes the versatility of teaching aid 10. Detachably connected to fixed circle 12 is a flexible distance selector 32, while a linear number reference bar or line 34 is also disposed adjacent circle 12.

Securing means 16 has the dual function of not only securing the transparent circles to the reference structure or blackboard, but also indicates the particular quadrants by arranging such securing means in each quadrant. For example a particularly advantageous type of securing means is commercially available double faced tape. Each piece of such tape would include a number indicating it particular quadrant.

The circles and number line reference plate 34 are dimensioned so that the radius of the circles and plate 34 are equal to one unit. Accordingly, reference line 34 has suitable indicia thereon at fixed intervals which are the function of pi.

Flexible distance selector 32 is in the form of a plug 36 having a string or band 38 attached thereto at one end with the other end being secured to the housing or casing 40 for writing implement or chalk 42. As shown in FIG. 2 string 38 is substantially thinner than fixed circle 12. Advantageously the housing 40 includes a split chuck 44 for detachable holding the chalk 42 while the string or band 38 is disposed internally of the housing over one of the spaced jaws 45 of the chuck 44 and emerges through the housing in an opening in slidable clamping ring 46. This arrangement is particularly advantageous since a certain distance can be selected and that distance held fixed by sliding ring 46 on the chuck 44 to clamp the string 38 between housing or casing and the jaw of the chuck.

As shown in FIGS. 1–3 the proper orientation of number line 34 with the circles is assumed by providing a dove tail opening 48 in fixed circle 12 to receive a complementary dove tail shape of the reference line 34. A shoulder 50 on the reference line abuts against the fixed circle 12 so that the indicia on the reference line are spaced from the point of attachment of flexible distance selector 32 with the circles by the proper distance indicated thereon. If desired, additional suitable detachable fastening means 53 may also be provided for number line 34.

A plurality of holes 51 are provided in fixed circle 12 to snugly receive the plug 36. These holes are disposed at the X and Y axes. As shown in FIG. 1 number line 34 includes an offset portion 52 to accommodate plug 36 and thus assure the reference surface 54 of number line 34 being substantially colinear and co-planar with flexible distance selector 32.

As shown in FIG. 1, indicia are also on movable circle 18 provided at the intersection of the rectangle 26 with the X and Y axes when the rectangle is in the position indicated in FIG. 1, and at the corners of the rectangle. Moreover, indicia are provided at the intersection of the X and Y axis with the circumference of the circle and at the center of the circle. Further a radian line 56 is printed on the movable circle 18 and is preferably arranged perpendicular to one of the diagonal lines. In the illustrated embodiment of this invention the perpendicular diagonal line is line 28. Indicia is also provided for radian line 56.

By proper manipulation of teaching aid 10 a wide variety of trigonometric functions may be visually demonstrated. A few of these functions are illustrated in FIGS. 4–7. FIG. 4, for example, clearly shows how it is possible to inscribe a right angle triangle in a semi-circle. In this respect the right angle triangle BAD or BKD is each inscribed in a semi-circle.

Figure 5:
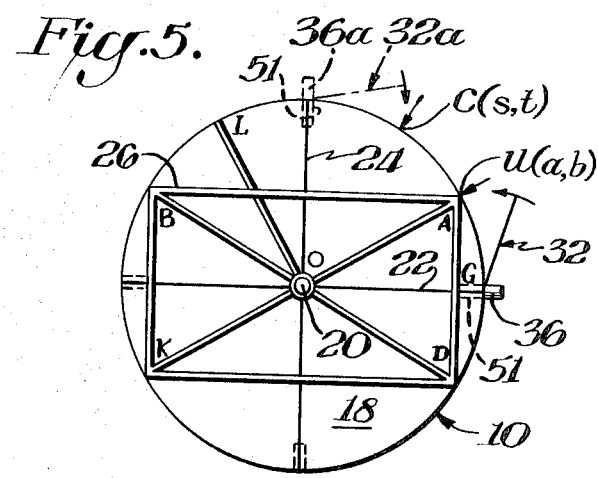

FIG. 5 demonstrates that if a point U in the X-Y coordinate system has values of (a, b) then ARC GP minus ARC GU has values of (b, a). As indicated therein an arbitrary point U is selected on the circles and this distance is wrapped or picked off by distance selector 32. This point is defined by the values (a, b). Plug 36 is then removed from its hole along the X axis and is inserted in the corresponding hole at P as indicated at 36a along the Y axis and the previously selected distance is wrapped along the circles in a clockwise direction with the resultant point being arbitrarily designated as C and its coordinates as (s, t). At the point P on the Y axis the corresponding coordinate values are (0, 1) while on the point G on the X axis the values are (1, 0). The cord distance from P to C is then equal to cord distance from G to U. Therefore $(s-0)^2 + (t-1)^2 = (a-1)^2 + (b-0)^2$ or $s^2 + t^2 - 2t + 1 = a^2 - 2a + 1 + b^2$ or $-2t + 2 = -2a + 2$. Therefore $t = a$ and therefore $b = s$. Accordingly, the point C having coordinates of (s, t) also has coordinates of (b, a).

Figure 6A:
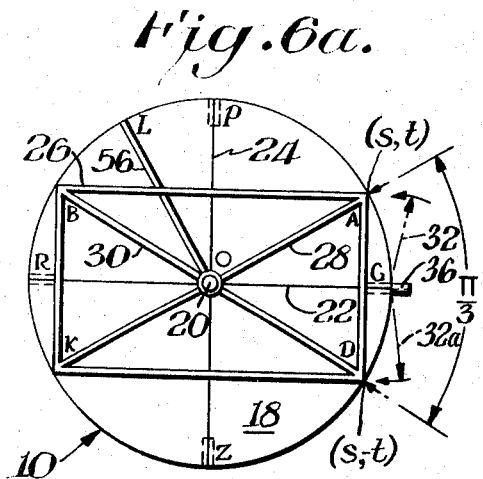
Figure 6B:
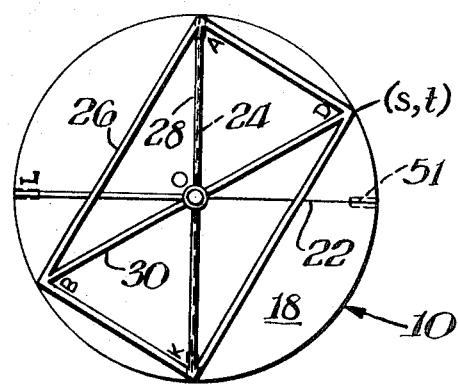

FIG. 6 illustrates a further use of the teaching aid 10. As indicated therein by proper manipulation it is possible to prove that ARC GA = $\pi/6$, has coordinate values of ($\sqrt{3}/2$, 1/2) at A. To prove this the distance $\pi/6$ is wrapped in FIG. 6a to point A which is assumed to have the arbitrary coordinate values of (s, t). The distance of $\pi/6$ is wrapped to point D having the coordinate values of (s, -t). The arc length AD is thus = to $\pi/3$ units and the arc length GA is = to $\pi/6$. It therefore follows that the arc length AP = $\pi/3$. The movable circle or disc 18 is then rotated to the position shown in the FIG. 6b to show that the cord length AD is equal to the cord length AP and therefore in FIG. 6a the arc length AD = AP. Since the point P has coordinate values of (0, 1) and G has coordinate values of (1, 0) thus the cord length AP = AD thus $(AP)^2 = (s-0)^2 + (t-1)^2$ and the cord length $(AD)^2 = (2b)^2$. Therefore $s^2 + (t-1)^2 = (2b)^2$. It therefore follows that $t = 1/2$ and that $s = \sqrt{3}/2$.

Figure 7:
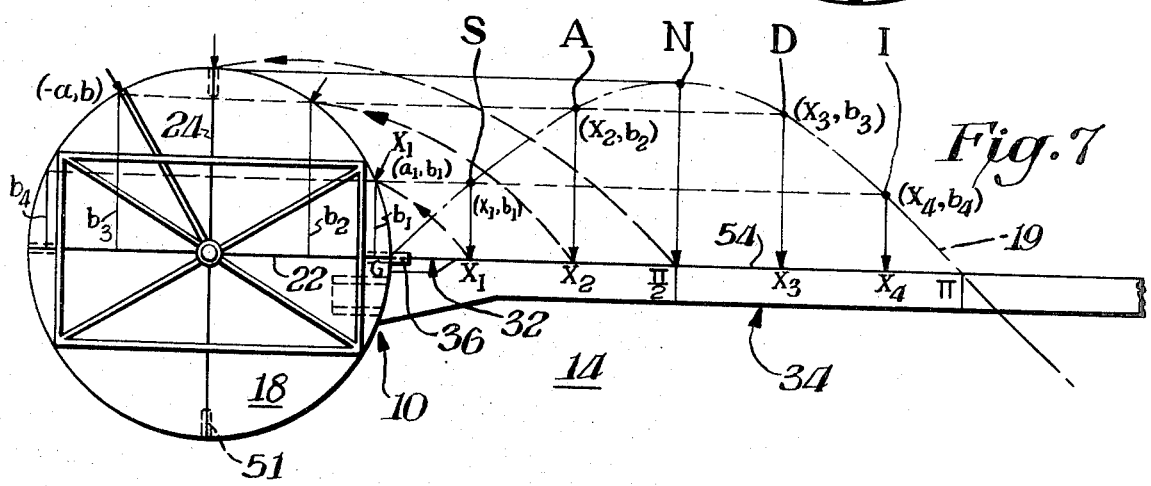

FIG. 7 shows the utilization of the teaching aid 10 to accurately graph the sine function. This is done by first drawing vertical lines on the blackboard or support surface 14 from pre-selected points $X_1$, $X_2$, etc., on reference line 34. The distance from point G to, for example $X_1$ on the number line 34 is wrapped around the circle and the vertical distance to the X axis or its Y value is measured (this may be conveniently done by utilization of the flexible distance selector) and transposed to the vertical line extending above $X_1$ on reference line 34. This distance is arbitrarily indicated by the point S. A second arbitrary value $X_2$ is selected on reference line 34, wrapped around the circle and its Y value is transposed above the number line 34 as indicated by the point A. A third value is selected at for example $\pi/2$ and its Y component transposed above reference line 34 as indicated by the point N. A fourth arbitrary value is selected at $X_3$ and its Y component is indicated above reference line 34 as indicated by the point D. Similarly, the vertical or Y component of arbitrary $X_4$ is indicated by the letter I. This process is repeated for any number of arbitrary points. For values in the third and fourth quadrants the Y component is a negative value and is drawn on the reference line below line 34. When all of the lines are joined together an accurate sine wave 19 is thus created.

As can be appreciated, by proper manipulation of the apparatus 10 and utilization of the various indicia thereon a countless number of other trigonometrical functions can also be demonstrated.

What is claimed is:

1. A circular function teaching aid comprising a first disc, a second disc concentrically superimposed over said first disc and made of a material sufficiently transparent to permit said first disc to be visible through said second disc, means for causing said discs to be relatively movable with respect to each other, one of said discs having a visible X axis and a visible Y axis thereon, a visible rectangle being disposed on the other of said discs and symmetrically arranged with respect to its center, the corners of said rectangle being coarcuate, a visible diagonal line connecting opposite corners of said rectangle and extending through said center of said other disc, and a flexible distance selector attached tangentially to one of said discs at one end thereof and freely movable remote from its point of attachment.

2. The teacing aid of claim 1 including a support surface, said one disc being fixed relative to said support surface, and pivot means connecting said other disc to be relatively movable with respect to said first disc, and said corners of said rectangle being disposed at the circumference of said movable disc.

3. The teaching aid of claim 2 including a number line adjacent said discs and colinear with said X axis, said number line being co-planar with said distance selector, and indicia on said number line at fixed intervals whereby said distance selector may be disposed over said number line to select a linear distance and the linear distance may then be circumscribed around said circles to be transposed into an arcuate distance.

4. The teaching aid of claim 3, including securing means for mounting said fixed disc to said support surface, said fixed disc being transparent, and said securing means being disposed in each quadrant of said fixed disc to further comprise visible quadrant indicators.

5. The teaching aid of claim 4 wherein said movable disc is capable of having removable markings made thereon, and said fixed intervals being multiples of pi radians.

6. The teaching aid of claim 5 wherein four equally spaced detachable distance selector mounting means are provided along the circumference of said fixed disc at each end of both said X and said Y axes.

7. The teaching aid of claim 6 wherein said detachable mounting means includes four spaced holes in said fixed disc, said distance selector including a plug for selective insertion into said holes, a flexible band secured at one end to said plug, a writing implement secured to the opposite end of said band, and means for locking said band to said implement at preselected distances.

8. The teaching aid of claim 7 wherein said number line is a flat bar having indicia thereon, an edge of said bar being radial with respect to said fixed disc, and said edge of said bar being offset adjacent said fixed disc to accommodate said plug with said plug thereby being radial with respect to said fixed disc.

9. The teaching aid of claim 8 wherein said movable circle includes a radius line disposed perpendicular to a diagonal line joining diametrically opposite corners of said rectangle, and indicia being on said movable circle at the intersections of said rectangle with said X and Y axes and at said corners of said rectangle and at the intersections of said X and Y axes with the circumference of said movable circle and at the center of said movable circle.

10. The teaching aid of claim 9 wherein said number line is at least $2\pi$ units long.

* * * * *

UNITED STATES PATENT OFFICE
CERTIFICATE OF CORRECTION

PO-1050 (5/69)

Patent No. 3,663,732      Dated May 16, 1972

Inventor(s) JAMES A. POLK

It is certified that error appears in the above-identified patent and that said Letters Patent are hereby corrected as shown below:

Column 3, line 35, "$(2B)^2$" should be --- $(2t)^2$ ---

Column 4, line 28, "circles" should be --- discs ---

Signed and sealed this 24th day of October 1972.

(SEAL)
Attest:

EDWARD M. FLETCHER, JR.
Attesting Officer

ROBERT GOTTSCHALK
Commissioner of Patents